(12) United States Patent
Johnson et al.

(10) Patent No.: US 11,297,758 B2
(45) Date of Patent: Apr. 12, 2022

(54) AUTOMATED LEVELING SYSTEM FOR MAINTAINING LEVEL OF A SURFACE

(71) Applicant: INTERNATIONAL BUSINESS MACHINES CORPORATION, Armonk, NY (US)

(72) Inventors: Benjamin Luke Johnson, Baltimore City, MD (US); Charles E. Beller, Baltimore, MD (US); Carmine Dimascio, West Roxbury, MA (US); Donna K. Byron, Petersham, MA (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 16/382,418

(22) Filed: Apr. 12, 2019

(65) Prior Publication Data

US 2020/0080266 A1 Mar. 12, 2020

Related U.S. Application Data

(63) Continuation-in-part of application No. 16/125,929, filed on Sep. 10, 2018, now abandoned.

(51) Int. Cl.
*A01C 7/00* (2006.01)
*E01C 23/07* (2006.01)
(Continued)

(52) U.S. Cl.
CPC ............ *A01C 7/008* (2013.01); *A01D 34/008* (2013.01); *A01D 43/14* (2013.01); *E01C 23/07* (2013.01); *G01C 7/04* (2013.01); *A01D 2101/00* (2013.01)

(58) Field of Classification Search
CPC ....... A01C 7/008; A01C 34/008; A01C 43/14; A01C 2101/00; E01C 23/07; G01C 7/04;
(Continued)

(56) References Cited

U.S. PATENT DOCUMENTS 1,749,805 A * 3/1930 Elliott ..................... E01C 23/07
404/108
4,482,960 A 11/1984 Pryor
(Continued)

FOREIGN PATENT DOCUMENTS

CN 102771246 A 11/2012
CN 203233683 U 10/2013
(Continued)

OTHER PUBLICATIONS

Eriksson, "The Pothole Patrol: Using a Mobile Sensor Network for Road Surface Monitoring", MobiSys'08, Jun. 17-20, 2008, pp. 1-11.
(Continued)

*Primary Examiner* — Alicia Torres
(74) *Attorney, Agent, or Firm* — Robert D. Bean (57) ABSTRACT

An automated leveling system for maintaining a level of a surface, comprising a surface traveling device and a leveling module attached to the surface traveling device. The leveling module comprises a depression detector arm assembly, at least one computing device, and a level-sensing detector. The level-sensing detector senses a level of a surface as the surface traveling device operates across the surface. The level-sensing detector moves across the surface according to the operation of the surface traveling device, and transmits a depression reporting signal to the computing device. The
(Continued)

depression reporting signal indicates the presence of a depression in the surface if the level-sensing detector contacts a depression in the surface over a depression threshold.

16 Claims, 10 Drawing Sheets

(51) Int. Cl.
*A01D 43/14* (2006.01)
*A01D 34/00* (2006.01)
*G01C 7/04* (2006.01)
*A01D 101/00* (2006.01)

(58) Field of Classification Search
CPC ... A01D 34/008; A01D 43/14; A01D 2101/00
See application file for complete search history.

(56) References Cited

U.S. PATENT DOCUMENTS

| | | | |
|---|---|---|---|
| 5,131,788 A | | 7/1992 | Hulicsko |
| 5,584,597 A | * | 12/1996 | Lemelson ............... E01C 23/06 299/41.1 |
| 6,113,310 A | * | 9/2000 | Hesse, Jr. ........... E01C 19/4826 404/108 |
| 8,381,501 B2 | | 2/2013 | Koselka et al. |
| 9,137,943 B2 | | 9/2015 | Einecke et al. |
| 9,416,499 B2 | | 8/2016 | Cronin et al. |
| 2005/0097816 A1 | | 5/2005 | Elder et al. |
| 2013/0041526 A1 | | 2/2013 | Ouyang |

FOREIGN PATENT DOCUMENTS

| | | | | |
|---|---|---|---|---|
| FR | 2576336 A1 | * | 7/1986 | ............. E01C 23/07 |
| FR | 2593199 A1 | * | 7/1987 | ............. E01C 23/07 |
| FR | 2653456 A1 | * | 4/1991 | ........... E01C 19/202 |

OTHER PUBLICATIONS https://www.husqvarna.com/us/products/robotic-lawn-mowers/, Get Automatic Peace of Mind with Automover Best-Selling Robotic Lawn Mower, Large Lawns, Commerical Grade, printed May 1, 2018, pp. 1-11.

Mednis et al.," Real Time Pothole Detection Using Android Smartphones with Accelerometers", 2011 IEEE, pp. 1-6.

Li et al., "Recognizing Terrain Features on Terrestrial Surface Using a Deep Learning Model—An Example with Crater Detection", GeoAI'17, Nov. 7-10, 2017, 2017 Association for Computing Machinery, pp. 1-4.

Enviroscan, http://www.enviroscan.com/home/, 2018 Copyright Enviroscan, pp. 1-2.

Bioadvanced, https://www.bioadvanced.com/articles/lawn-care-how-repair-ruts-and-ho . . . , "Lawn Care: How to Repair Ruts and Holes", printed Sep. 10, 2018, pp. 1-3.

Pending U.S. Appl. No. 16/125,929, entitled:"Automated Groundskeeping System for Maintaining Level of a Ground Surface", filed Sep. 10, 2018, 36 pages.

* cited by examiner

AUTOMATED LEVELING SYSTEM FOR MAINTAINING LEVEL OF A SURFACE

BACKGROUND

The present invention relates generally to an automated leveling system, and more particularly to an automated leveling system for detecting depressions in a surface.

BRIEF SUMMARY

Embodiments of the present invention disclose an automated leveling system for maintaining a surface. The automated leveling system comprises a surface traveling device and a leveling module attached to the surface traveling device. The leveling module comprises a depression detector arm assembly, at least one computing device, and a level-sensing detector. The level-sensing detector senses a level of a surface as the surface traveling device operates across the surface. The level-sensing detector moves across the surface according to the operation of the surface traveling device, and transmits a depression reporting signal to the computing device indicating the presence of a depression in the surface if the level-sensing detector contacts a depression in the surface over a depression threshold.

Further embodiments of the present invention present a method and computer program product for automatic groundskeeping using an automated leveling module associated with a surface traveling device for maintaining a surface. Normal surface parameters are calibrated by a computing device as a surface traveling device travels across a surface. A determination is made by the computing device via a recoil section sensor a level of a level-sensing detector associated with an automated leveling module on the surface to determine whether the level-sensing detector extends past a depression threshold to location a depression in the surface. A determinization is made by the computing device whether one or more accelerometers indicate surface traveling device has pitched beyond a pitch threshold or rolled beyond a roll threshold on the surface. The computing device receives depression data. A determination is made by the computing device regarding an amount of grass seed, soil, or grass seed mixed with soil to dispense by dispensing compartment. The computing device commands an electronically operated spout to dispense the determined amount of grass seed, soil, or grass seed mixed with soil by an electronically operated spout associated with the dispensing compartment.

DETAILED DESCRIPTION

Automated lawnmowers and other computer-guided robotic tools are increasingly used for performing various functions which would traditionally be performed by humans, such as maintaining greenspaces and other ground surfaces such as golf courses, fields for sports, parks, lawns, vacuuming, mopping, paving, etc. Presently existing automated lawnmowers are made to trim grass by automatically cutting or clipping it, but do not serve to detect or repair depressions and other irregularities in the ground surface. Similarly, computer-guided robotic tools are designed for vacuuming, mopping, paving, etc. and perform the desired functionality, but can be designed to detect and/or repair depressions and irregularities in the surfaces they operate upon.

Depressions in surfaces (such as ground surfaces or greenspaces) are areas of the ground surface that are lower in elevation than the level of the average surface level of the ground surface. Other irregularities in the ground surface may also exist, such as small hills, rocks, large plants, etc. These depressions and other irregularities often form in vigorously-used ground surfaces such as golf courses, with divots made from swinging golf clubs, or formed in sports fields with depressions made from being scraped or kicked by soccer players, for example. In the case of parks and lawns, depressions and other irregularities may simply form from normal use by individuals walking across the ground surface, or for any other reason. Irregularities in concrete or paving surfaces may occur from normal use by street traffic, by foot traffic, by weather events, plowing, etc. Depressions in greenspaces and other ground surfaces increase the risk of an individual slipping and injuring him or herself, and in the case of sports such as golf, soccer, or baseball may prevent the game from being properly played, and are unsightly. In the case of paved surfaces or concrete surfaces, depressions may cause damage to vehicles crossing the surface, car accidents, and other issues. Various risks are involved with various surfaces.

The present invention offers an automated leveling module for automatically maintaining the level of a ground surface. The present invention may be may be implemented as an add-on to an existing manual or automatic groundskeeping device, or any other sort of device which moves across a surface ("surface traveling device"), whether under its own power or propelled externally. In alternative embodiments, the present invention may be implemented as an independent device performing the various functions of the presently disclosed invention.

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will convey the scope of this disclosure to those skilled in the art. In the description, details of well-known features and techniques may be omitted to avoid unnecessarily obscuring the present embodiments.

Figure 1:
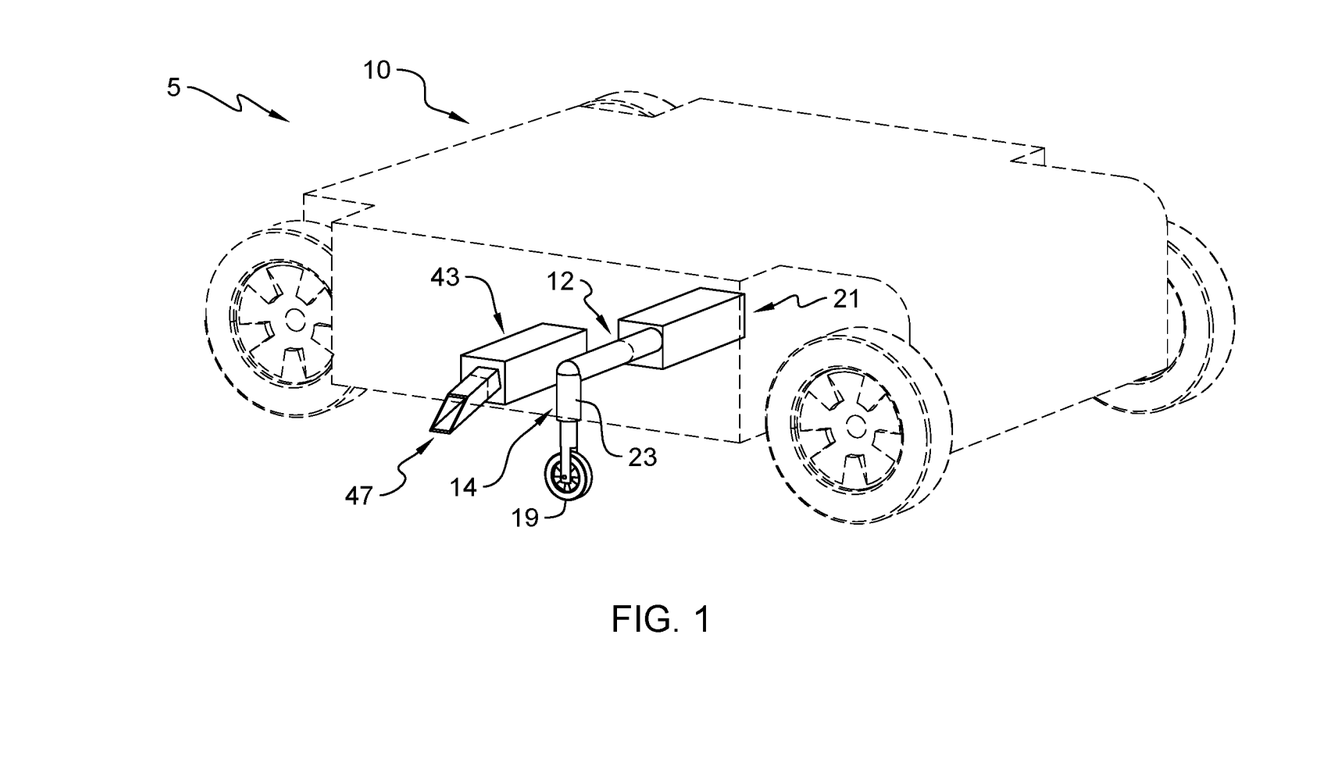
FIG. 1 is a schematic diagram of an automated leveling system 5, in accordance with an embodiment of the present invention.
Figure 2A:
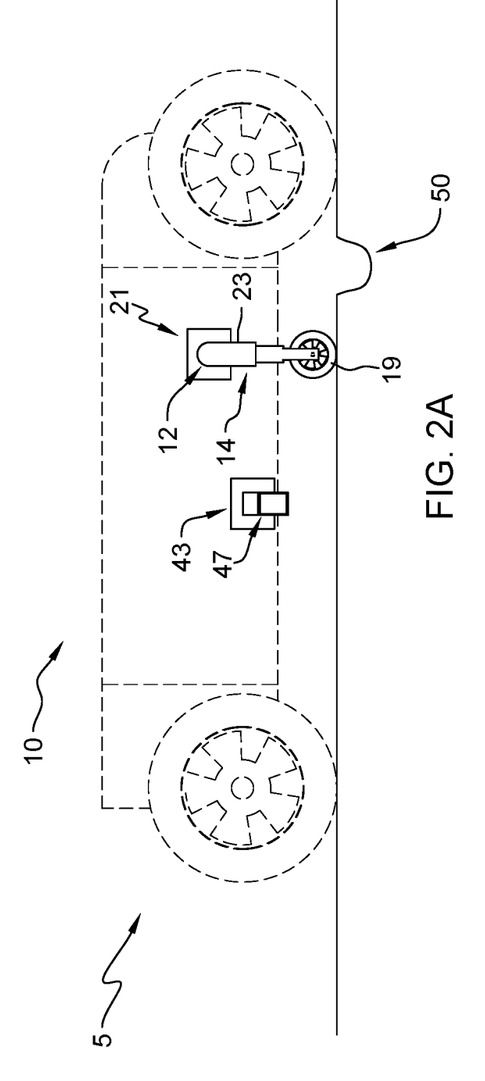
FIGS. 2A, 2B, and 2C display operation of an automated leveling system 5 across a ground surface, in accordance with an embodiment of the present invention.
Figure 2B:
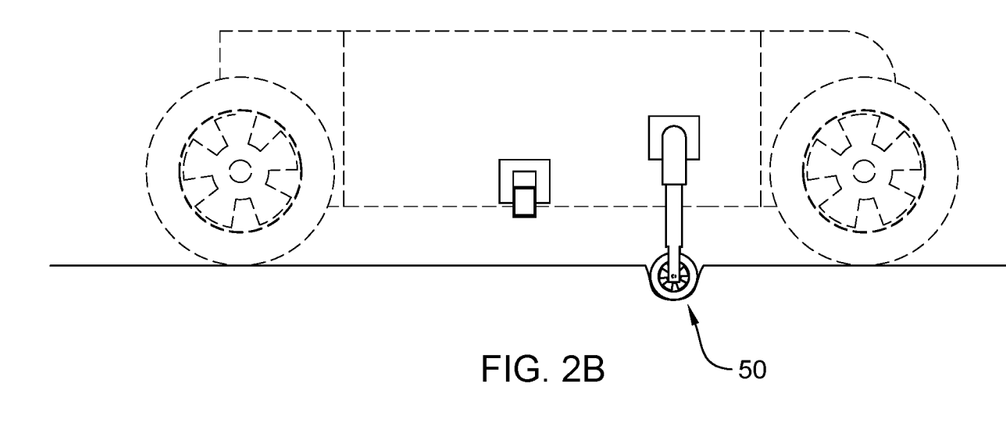

Referring now to the drawings for a better understanding of the present invention, automated leveling system is generally displayed in FIG. 1 et seq. as 5. Representative groundskeeping device is generally displayed in FIG. 1 et seq. as 10 with installed leveling module generally displayed in FIG. 1 et seq. as 12. In various embodiments of the invention, groundskeeping device 10 is an automatically controlled or manually controlled lawnmower, tractor, or other motorized groundskeeping device which may be electric-powered or gasoline-powered, while in other embodiments (not displayed here), groundskeeping device 10 may be replaced by a vacuum, mopping robot, automated paver, or any other sort of device which moves across any sort of surface self-propelled or propelled by others. Groundskeeping device 10 operates by traveling across and maintaining a ground surface by mowing grass and other plants growing in the ground surface to an even level, for aesthetic purposes such as in the case of parks or lawns, and/or for functional purposes such as in the case of a golf course, soccer field, or baseball field (requiring the ground surface to be an even height for sporting purposes). As displayed in FIGS. 2A, 2B, and 2C, as groundskeeping device 10 moves across the ground surface, built-in or attached leveling module 12 detects depressions and other irregularities in the ground surface, such as depression 50. In alternative embodiments of the invention, groundskeeping device 10 may be any device capable of moving automatically or manually on a ground surface to allow for operation of the presently disclosed invention.

In various embodiments of the invention, leveling module 12 is comprised of a depression detector arm assembly 14 (containing one or more parts as further discussed below), one or more computing device(s) 37 performing various functions, and a level-sensing detector 19. Level-sensing detector 19 senses the level of the surface as the groundskeeping device 10 operates across the surface, detecting, in various embodiments of the invention, a width, a depth, and/or other dimensions of depression(s) 50, and transmits a reporting signal to the computing device(s) 37 if the level-sensing detector 19 encounters depression 50 in the ground surface over a depression threshold. The depression threshold is preconfigured during manufacture or configured by a user. Level-sensing detector 19 is physically attached and held by the depression detector arm assembly 14 via insertion into the depression detector arm assembly 14, screws, clips, a rail-system, or the equivalent. Alternatively, level-sensing detector 19 and depression detector arm assembly 14 may be formed from the same plastic, metal, ceramic, or other material and permanently joined. In further embodiments, level-sensing detector 19 may utilize other technology to identify depression 50, for example through sonar, radar, light reflection, and the like.

During operation, groundskeeping device 10 moves along the ground surface automatically and under its own power such as in the case of an automatically controlled lawnmower or tractor, or moves manually by a human pushing, riding, controlling, or otherwise directing groundskeeping device 10 in the case of a manually controlled lawnmower (or in another fashion, in other embodiments of the invention). Since, in various embodiments, leveling module 12 is attached to groundskeeping device 10, leveling module 12 moves in accordance with the groundskeeping device 10, as the groundskeeping device 10 travels across the ground surface. As further discussed herein, leveling module 12 detects the level of the ground surface as the groundskeeping device 10 moves and, in various embodiments, works with dispensing compartment 43 to automatically repair depressions in the ground surface (such as depression 50) as further discussed or, alternatively, automatically indicates a location of the depression 50 for a recipient to repair the depression 50 in the ground surface.

In various embodiments of the invention, as displayed in FIG. 1 et seq. level-sensing detector 19 may take the form of a wheel formed from metal, rubber, plastic, or other material adapted for rolling along the ground surface in a substantially same axis of motion as the groundskeeping device 10, and along the contour of the ground surface. Level-sensing detector 19 detects a level of the ground surface and associated irregularities such as depression 50 as the groundskeeping device 10 travels. When level-sensing detector 19 travels into a depression 50 that exceeds the depression threshold in depth (or, in alternative embodiments, width, or height), level-sensing detector 19 transmits a depression reporting signal to computing device(s) 37. The depression reporting signal indicates the presence of the depression in the ground surface for further processing by computing device(s) 37 as discussed herein. In alternative embodiments of the invention, level-sensing detector 19 may take the form of a device formed from wire or spring, a semi-circular device, or any other physical form which provides for level-sensing detector 19 to follow the contour of the ground surface, including depressions, small-rises, rocks, etc. and to report the depressions and other irregularities. In other alternative embodiments, level-sensing detector 19 may utilize sonar, radar, light reflection, or other technologies. In a further embodiment of the invention (not shown here), level-sensing detector 19 may be integrated with recoil section sensor 31.

Depression detector arm assembly 14 is formed from plastic, metal, or other material and contains one or more parts, including groundskeeping device attachment component 21 for attaching the depression detector arm assembly 14 to the groundskeeping device 10, a detector-holding rod 23 extending towards the ground surface and holding the level-sensing detector 19, and a recoil section 17 located within or between the groundskeeping device attachment component 21 and the detector-holding rod 23, providing tension to push the level-sensing detector 19 towards the ground surface and to follow the contour of the ground surface while the groundskeeping device 10 is operating.

Detector-holding rod 23 of depression detector arm assembly 14 is formed from plastic, metal, or another material and may be a fixed L-shaped, T-shaped, or other-shaped component to hold the level-sensing detector 19 in a temporary or permanent fashion, allowing motion of the groundskeeping device 10 to also move the level-sensing detector 19, as well as other components of the leveling module 12, and thereby provide various functionality in connection with the presently disclosed invention. Level-sensing detector 19 may be temporarily or permanently physically attached to detector-holding rod 23 via insertion into the detector-holding rod 23, screws, clips, a rail system, or any equivalent. Alternatively, level-sensing detector 19 and detector-holding rod 23 may be formed from a same or different plastic, metal, or other material, and permanently joined.

Groundskeeping device attachment component 21 serves to attach the depression detector arm assembly 14 to the groundskeeping device 10. Groundskeeping device attachment component 21 may take the form of a plate or box formed from plastic, metal, or another material that attaches flush (i.e., completely level and/or even) with a portion of a surface of the groundskeeping device 10. Alternatively, groundskeeping device attachment component 21 takes the form of a hollow L-shaped, J-shaped, or T-shaped structure that attaches flush with the portion of the surface of the groundskeeping device 10. The connection between groundskeeping device attachment component 21 and groundskeeping device 10 may be temporary, such that a user can attach groundskeeping device attachment component 21 to the groundskeeping device 10 via screws, clips, or a rail system, etc. when utilization of the presently-disclosed invention is desired and removed from the groundskeeping device 10 when utilization is not desired, or groundskeeping device attachment component 21 may be permanently formed into the plastic, metal, or other material groundskeeping device 10 is formed from for a permanent attachment. In various embodiments of the invention, as further discussed below and shown further in connection with FIG. 3, groundskeeping device attachment component 21 may house one or more of recoil section sensor 31, accelerometer 33, global positioning system 35, and computing device(s) 37. Groundskeeping device attachment component 21 may be formed from metal or plastic serving to reduce electromagnetic interference and vibrational shock generated by groundskeeping device 10.

Recoil section 17 provides elastic tension to push the level-sensing detector 19 towards and onto the ground surface while the groundskeeping device 10 is operating. As displayed in connection with FIG. 3, recoil section 17 is a metal spring or any other mechanical device storing mechanical energy for pushing level-sensing detector 19 onto the ground surface. As displayed in FIG. 3, recoil section 17 is positioned inside of groundskeeping device attachment component 21, with a first end of recoil section 17 attached to the level-sensing detector 19 and a second end of recoil section 17 attached to recoil section sensor 31 and/or groundskeeping device attachment component 21 (which may or may not be housed inside the groundskeeping device attachment component 21). In alternative embodiments recoil section 17 is located external to groundskeeping device attachment component 21, or incorporated into a elastomeric material groundskeeping device attachment component 21 is formed from, such as metal, rubber, a type of plastic, etc., with the integrated recoil section 17 providing the necessary force to push the level-sensing detector 19 towards the ground surface, and thereby sense the contour of the ground surface.

Figure 3:
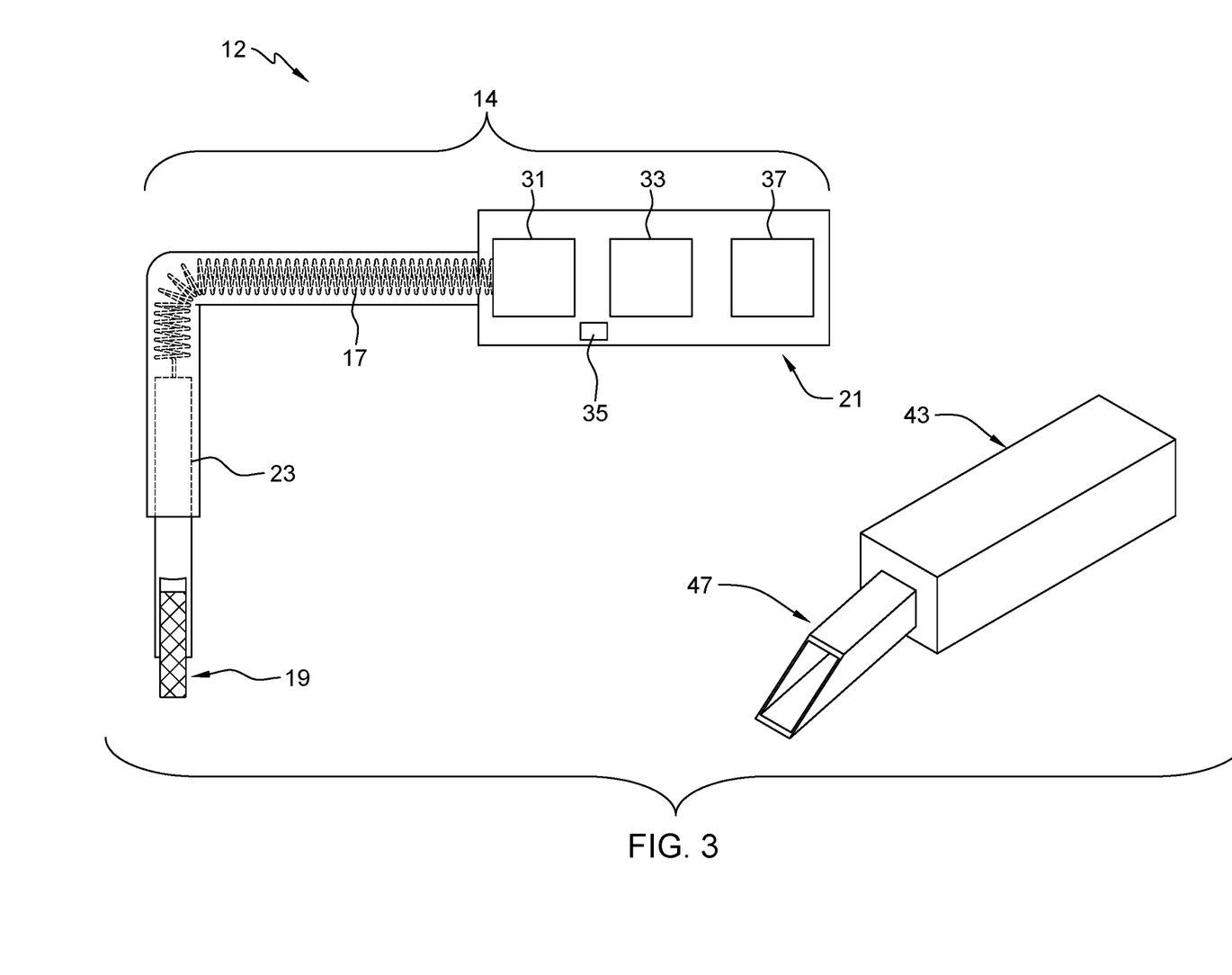
FIG. 3 is a schematic diagram illustrating surface traveling device attachment component 21 and dispensing compartment 43, in accordance with an embodiment of the present invention.

As displayed in more detail in connection with FIG. 3, in various embodiments of the invention groundskeeping device attachment component 21 also houses various electronic components of the invention, including one or more of recoil section sensor 31 for sensing a position of the level-sensing detector 19 with regard to the ground surface (and thereby detect irregularities in the ground surface, such as depression 50), one or more accelerometer(s) 33 to detect a pitch or a roll of the groundskeeping device 10 on the ground surface, a global positioning system 35 to indicate the geographical location of the groundskeeping device 10 in real-time (to be used in communicating the location of depression 50, as further discussed herein), and one or more computing device(s) 37 which performs assorted functions as further discussed herein.

Figure 2C:
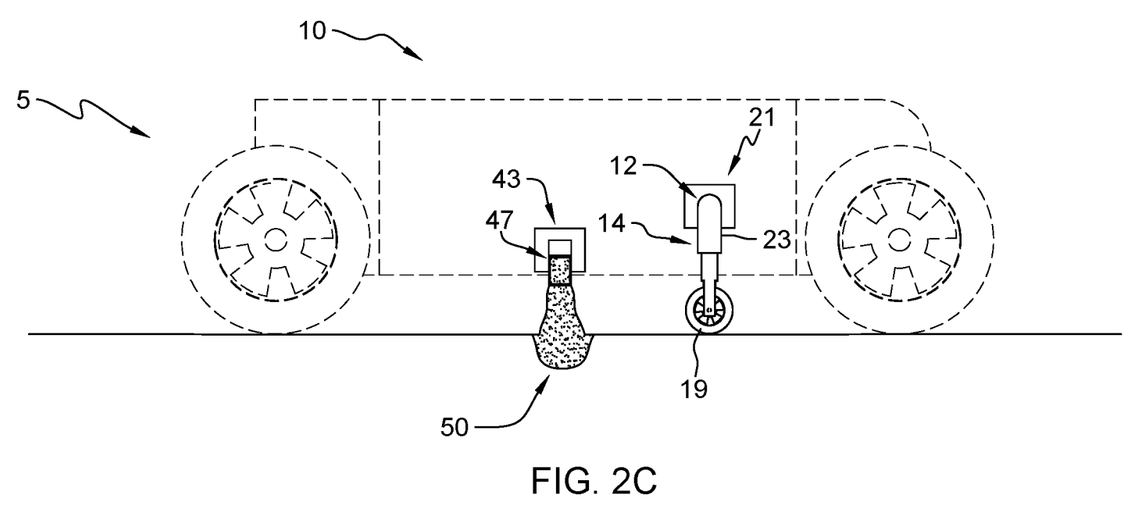

Recoil section sensor 31 is an electrical or electromechanical sensor to sense the position of the level-sensing detector 19 as it crosses the ground surface. In various embodiments of the invention, recoil section sensor 31 is housed in groundskeeping device attachment component 21, directly above level-sensing detector 19, or is located elsewhere in the leveling module 12. As level-sensing detector 19 rolls across irregularities in the ground surface, such as depression 50, the irregularities cause the level-sensing detector 19 to move up and down following the contour of the ground surface. The first end of recoil section 17 connects to level-sensing detector 19 and provides elastic tension to push the level-sensing detector 19 towards the ground surface, while the second end of recoil section 17 pushes against recoil section sensor 31, which detects a force transmitted by the recoil section 17 as level-sensing detector 19 travels across the ground surface, causing the level-sensing detector 19 to compress and decompress the recoil section 17 and thereby change force exerted on level-sensing detector 19, causing transmission of the depression reporting signal to the computing device(s) 37. The amount of force exerted onto level-sensing detector 19 allows the level-sensing detector to detect depression 50 and other irregularities in the ground surface. As shown in connection with FIG. 2A, as groundskeeping device 10 is rolling along the ground surface, recoil section 17 pushes level-sensing detector 19 level with the ground surface. Recoil section sensor 31 senses the level of force exerted upon it by the recoil section 17 and determines that flat ground is being encountered. As shown in connection with FIG. 2B, when level-sensing detector 19 encounters a depression 50, recoil section 17 pushes level-sensing detector 19 into the depression 50. Recoil section sensor 31 senses a change in pressure exerted by recoil section 17, and determines that level-sensing detector 19 is located in depression 50 if the pressure exerted by recoil section 17 indicates that level-sensing detector 19 is in a depression 50 over the depression threshold. As shown in connection with FIG. 2C, as groundskeeping device 10 continues to move forward along the ground surface, a side of depression 50 is reached and level-sensing detector 19 moves back to flat ground. Level-sensing detector may be able to determine a length, a width and/or other dimensions of depression 50 based upon a known velocity of the groundskeeping device 10 and a length of time level-sensing detector 19 senses depression 50, the slope of the depression 50, and other information. Recoil section sensor 31 detects another change in pressure exerted on it by recoil section 17, to determine that flat ground is encountered again, (as shown in FIG. 2C, with FIG. 2C further displaying repair of the detected depression 50, via dispensing compartment 43, as further discussed herein). In other embodiments of the invention, recoil section sensor 31 may take other forms or be absent.

One or more accelerometer(s) 33, when present, are sensors that measure the acceleration of groundskeeping device 10, along one or more axes of travel of the groundskeeping device 10. When present, accelerometer(s) 33 may be located in groundskeeping device attachment component 21, or housed elsewhere in automated leveling system 5. Each of the one or more accelerometer(s) 33 may be associated with one axis of travel of the groundskeeping device 10 (such as travel of the groundskeeping device 10 along a hypothetical x-axis, y-axis, or z-axis). Accelerometer(s) 33 may be utilized to measure different motions of the groundskeeping device 10, including a pitch, a roll, or another motion of groundskeeping device 10 other than forward travel of the groundskeeping device 10 along the greenspace (although, in an embodiment of the invention, an accelerometer 33 could be configured to measure this acceleration as well). As groundskeeping device 10 operates on a hill on the greenspace, in a valley on the greenspace, etc., and tilts, rotates in any way, tips over, or moves in any other manner than along an ordinary, forward direction of travel for groundskeeping device 10, accelerometer(s) 33 detect pitch, roll, or other motion of groundskeeping device 10. In an embodiment of the invention, if groundskeeping device 10 pitches beyond a pitch threshold or rolls beyond a roll threshold as indicated by accelerometer(s) 33, accelerometer(s) 33 register the pitch or roll of the groundskeeping device 10, and cause the depression reporting signal transmitted by the level-sensing detector 19 (or transmitted by other electronic components as discussed herein) to not be registered and/or processed by the one or more computing device(s) 37, because the accelerometer(s) 33 indicates that the groundskeeping device 10, in effect, cannot properly report depression 50 because groundskeeping device 10 has rolled onto its side, is located in a hill or a valley, is being tilted back or moved over by a user, or for any reason is not on level enough ground to properly register depression 50. In a further embodiment of the invention, accelerometer(s) 33 are further utilized during operation on hilly terrain to indicate whether the groundskeeping device 10 is correctly angled for operation on a hill (based upon GPS knowledge of slope of the terrain that the groundskeeping device 10 is operating on), and if the accelerometer(s) 33 indicate that the groundskeeping device 10 has pitched beyond a pitch threshold appropriate for the terrain, or rolled beyond a roll threshold appropriate for the terrain, the depression reporting signal is not registered and/or processed.

Global positioning system 35, when present, is a global positioning tracking device, chip, module, etc. that indicates the geographical location of groundskeeping device 10 during operation to a high degree of accuracy. Global positioning system 35 may be located in the groundskeeping device attachment component 21, or housed elsewhere in automated leveling system 5. The geographical location of groundskeeping device 10 is utilized to indicate a depression gps location of depression 50, when encountered by automated leveling system 5. The depression gps location(s) may be reported via the one or more computing device(s) 37 to a user of the presently disclosed invention via user device 140 for manual repair.

One or more computing device(s) 37 are also present in groundskeeping device attachment component 21, or elsewhere in groundskeeping device 10. Computing device(s) 37 are computer processor(s), microcontroller(s), integrated circuit(s), or the equivalent, for performing various functionality in connection with the presently disclosed invention, including receiving and transmitting data from recoil section sensor 31, accelerometer(s) 33, and global positioning system 35, when any of these are present in the embodiment of the invention, and performing necessary data processing. Computing device(s) 37 serve to receive depression reporting signal from recoil section sensor 31 when depression 50 is encountered by level-sensing detector 19 in the greenspace, unless accelerometer(s) 33 indicate that groundskeeping device 10 has pitched beyond a pitch threshold or rolled beyond a roll threshold. Computing device(s) 37 may offer wi-fi, Bluetooth®, or other wireless networking technology for transmitting the location of a depression 50 to a user with user device 140 for manual repair, after it is received from global positioning system 35. Computing device(s) 37 also utilize wireless networking technology to send a notification to a user device 140 such as a smartphone, a tablet, a mobile device, etc. indicating the depression gps location, for manual repair by the user. In an embodiment of the invention, user device 140 also receives a notification to repair the detected depression at a geographical location with the determined grass seed and/or soil amount. Computing device(s) 37 may utilize a mathematical algorithm to determine the amount of grass seed, soil, or grass seed mixed with soil to repair the depression 50 (the mathematical algorithm user defined or predefined). In other embodiments of the invention, computing device(s) may determine an amount of flooring material, fill, paving material, or any other compound necessary to repair depression 50. Computing device(s) 37 may utilize wireless networking technology to access weather data, and further transmit to a user the optimal time to repair the depression 50 based on the weather data accessed. Computing device(s) 37 send a signal to dispensing compartment 43 or electronically operated spout 47 (when present) to dispense a determined amount of grass seed, soil, or grass seed mixed with soil into depression 50 (etc., as described above), with computing device(s) 37 determining the period of time for electronically operated spout 47 to be opened while groundskeeping device 10 operates across the greenspace, allowing the precise amount of grass seed, soil, or grass seed mixed with soil to be dispensed during this time. In further alternative embodiments water and/or fertilizer may additionally dispensed by dispensing compartment 43 or electronically operated spout 47. Other functionality of computing device(s) 37 is discussed herein.

In an embodiment of the invention such as displayed in connection with FIGS. 1-3, further included in automated leveling system 5 is dispensing compartment 43 to dispense grass seed, soil, or grass seed mixed with soil (or other materials, as described herein) to automatically repair a depression 50, if encountered by leveling module 12. Grass seed, soil, or grass seed mixed with soil (etc.) is dispensed from dispensing compartment 43 by electronically operated spout 47. Electronically operated spout 47 is opened automatically and closed automatically by one or more signal(s) transmitted by computing device(s) 37. When the signal to open electronically operated spout 47 is received from computing device(s) 37, grass seed, soil, or grass seed mixed with soil (etc.) is dispensed automatically from dispensing compartment 43 into depression 50 as displayed in FIG. 3C. Dispensing compartment 43 and electronically operated spout 47 are located on a side of groundskeeping device 10 directly behind level-sensing detector 19, to allow the grass seed, soil, or grass seed mixed with soil (etc.) to be automatically released by dispensing compartment 43 and fix depression 50 while groundskeeping device 10 is operating, immediately after level-sensing detector 19 encounters depression 50 allowing depression 50 to be quickly filled in. Alternatively, dispensing compartment 43 may be located at rear of groundskeeping device 10 (not pictured here). In an embodiment of the invention, when depression 50 is encountered, computing device(s) 37 in conjunction with leveling module 12 determines the depth, length, and width of depression 50. The determined depth, length, and width of depression 50 is then utilized by computing device(s) 37 to determine an amount of grass seed, soil, or grass seed mixed with soil (etc.) to dispense via utilization of a mathematical algorithm to repair depression 50. The amount of grass seed, soil, or grass seed mixed with soil (etc.) may be calculated by determining a period of time for electronically operated spout 47 to be opened while groundskeeping device 10 operates across the ground surface, allowing a precise amount of grass seed, soil, or grass seed mixed with soil (etc.) to be dispensed. The mathematical algorithm utilized by computing device 37 may be user-defined. For example, computing device(s) 37 may determine a volume of depression 50, determine a speed of groundskeeping device 10, then dispense an amount of grass seed/soil (etc.) at the appropriate time based on the determined volume and speed. Grass seed, soil, or grass seed mixed with soil (or other material, in accord with embodiments described herein) is used to repair depression 50 by filling the depression 50, so individuals may immediately utilize the ground surface without risk of encountering depression 50 when walking, running, playing a sport, etc. In embodiments, water and/or fertilizer (or other material) may additionally be dispensed. When grass seed or grass seed mixed with soil is utilized, the lawn of ground surface may grow back, allowing the return of uniformity to the greenspace. In a further embodiment of the invention, dispensing compartment 128 may be adapted to contain a cartridge filled with soil, grass seed, or grass seed mixed with soil that may be refilled after use, or replaced. Other materials may repair a surface for further utilization, in accordance with various embodiments of the invention.

Figure 4:
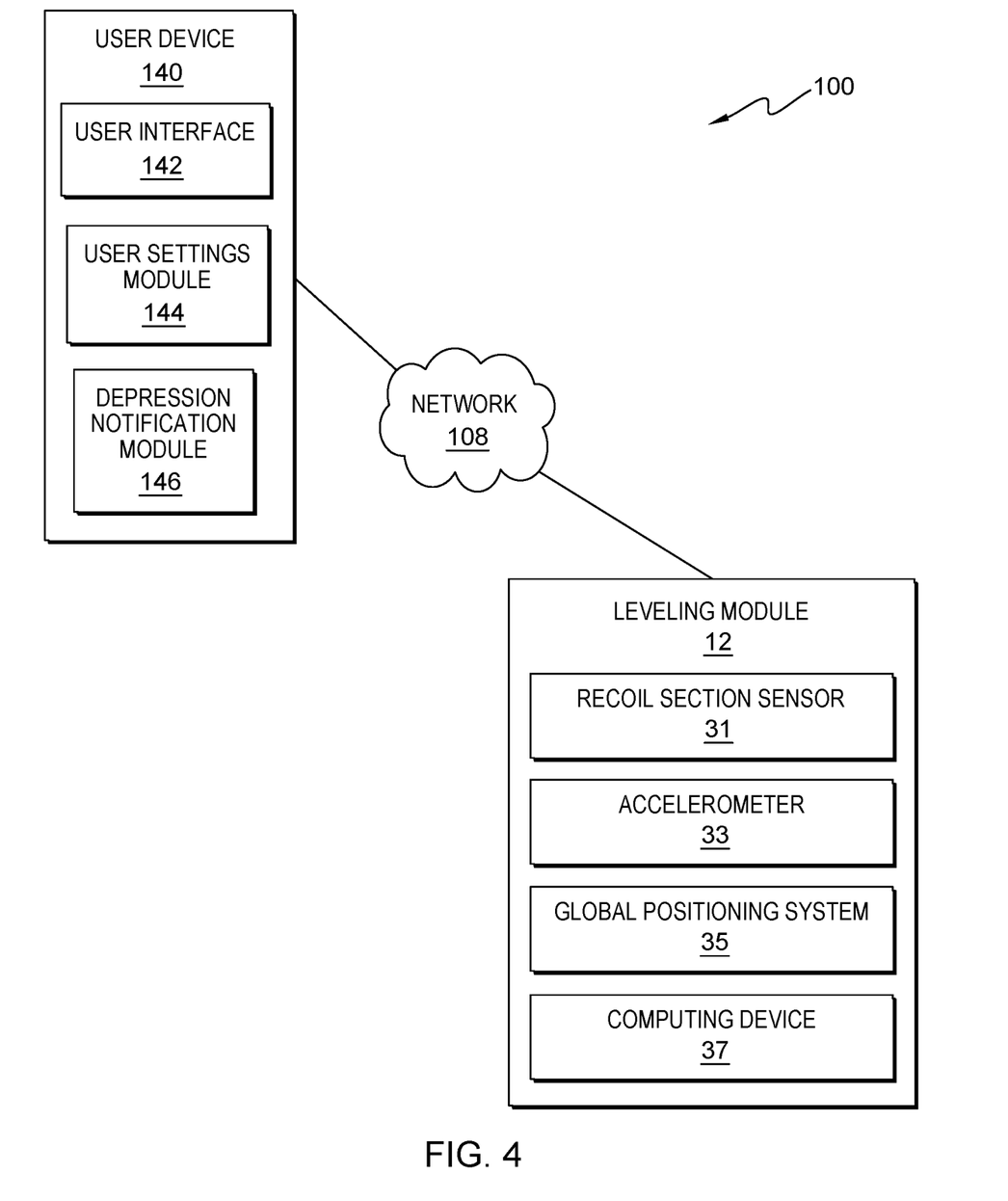
FIG. 4 is a block diagram displaying various components of leveling module 12 and user device 140, in accordance with an embodiment of the invention.

FIG. 4 is a block diagram displaying various electrical and software components utilized in an embodiment of the presently disclosed invention. FIG. 4 displays leveling module 12 (and included components) and user device 140 (and included components). Both are connected via network 108. Network 108 represents any sort of computer network, including a local area network (LAN), a wide area network (WAN) such as the Internet, and includes wired, wireless, or fiber optic connections. In general, network 108 may be any combination of connections and protocols that will support communications between leveling module 12, server 130, and user device 140.

As displayed in FIG. 4, in an embodiment of the invention, housed in leveling module 12 are recoil section sensor 31, accelerometer(s) 33, global positioning system 35, and computing device(s) 37. As further displayed in connection with FIGS. 2A, 2B, and 2C, as groundskeeping device 10 operates, recoil section sensor 31 senses the position of level-sensing detector 19 with regard to the ground surface as groundskeeping device 10 travels along greenspace. Recoil section sensor 31 is operatively connected to computing device(s) 37. If level-sensing detector 19 encounters a depression 50, level-sensing detector 19 causes a depression reporting signal to be transmitted to the computing device(s) 37. In the embodiment of the invention, accelerometer(s) 33 are also present in leveling module 12, and operatively connected to computing device(s) 37. Accelerometer(s) 33 continuously function during operation of leveling module 12, and if accelerometer(s) 33 indicate that groundskeeping device 10 has pitched or rolled beyond a pitch threshold or roll threshold, computing device(s) 37 receives a notification from accelerometer(s) 33, and logic internal to the computing device(s) 37 causes the depression reporting signal to not be registered and/or processed by the computing device(s) 37. In the embodiment of the invention, global positioning system 35 (if present) is also operatively connected to computing device(s) 37. If computing device(s) 37 receives the depression reporting signal from the level-sensing detector 19 and is registered and/or processed, computing device(s) 37 may communicate in real-time with the global positioning system 35 to determine the specific location of the depression 50 for later use, for compiling statistics, such as most common areas for depression(s) 50 and most effective soil/seed combinations for treating depression(s) 50 (or other materials), or for transmission to user device 140, as further discussed below. Computing device(s) 37, also included in leveling module 12 in this embodiment, are one or more computer processors, microcontrollers, integrated circuits, or the equivalent. Computing device(s) 37 perform various functionality as further discussed herein, and further include functionality for communication with user device 140 via network 108, including transmissions of various notifications and other data to user device 140, as further discussed herein.

User device 140 represents a computing device utilized by a user of the presently disclosed invention. In this embodiment of the invention, user device 140 is a smartphone, laptop, mobile device, tablet, personal computer, or any other computing device capable of being accessed by a user of the presently disclosed invention to access computerized functions of automated leveling system 5. In this embodiment of the invention, user device 140 contains a user interface 142, a user settings module 144, and a depression notification module 146. User interface 142 represents a software and/or hardware interface available on user device 140 for a user to access data transmitted by the leveling module 12 (such as a graphical user interface), including locations of detected depressions 50. Various user settings for groundskeeping device 10 are presented to user device 140 via user interface 142 in the embodiment of the invention, including a user setting for a depression threshold beyond which a depression 50 is detected by level-sensing detector 19, a user setting for an amount of grass seed, soil, or grass seed mixed with soil to be dispensed by electronically operated spout 47, a user setting for a pitch threshold and a roll threshold for detection by detection of pitch or roll of automated leveling system 5 by accelerometer(s) 33, and other user settings as discussed herein. User settings module 144 represents a hardware and/or software component that allows for access, storage, and editing of the various user settings of the user device 140. Depression notification module 146 represents a hardware and/or software component of user device 140 for receiving a notification from computing device(s) 37 of leveling module 12 regarding the existence and location of depression 50 (the location provided by global positioning system 35). The notification may appear to user of user device 140 as a pop-up window, an e-mail, an sms message, or in any other manner. The location of depression 50 may be utilized by the user to manually repair the depression 50. The received notification may also include an estimated amount of grass seed, soil, or grass seed mixed with soil (or other material, in accordance with the embodiment of the invention) to repair the depression 50, and further include an optimal time for dispensing of grass seed, soil, or grass seed mixed with soil (or other material) based upon weather data received by automatic groundskeeping program 132.

Figure 5:
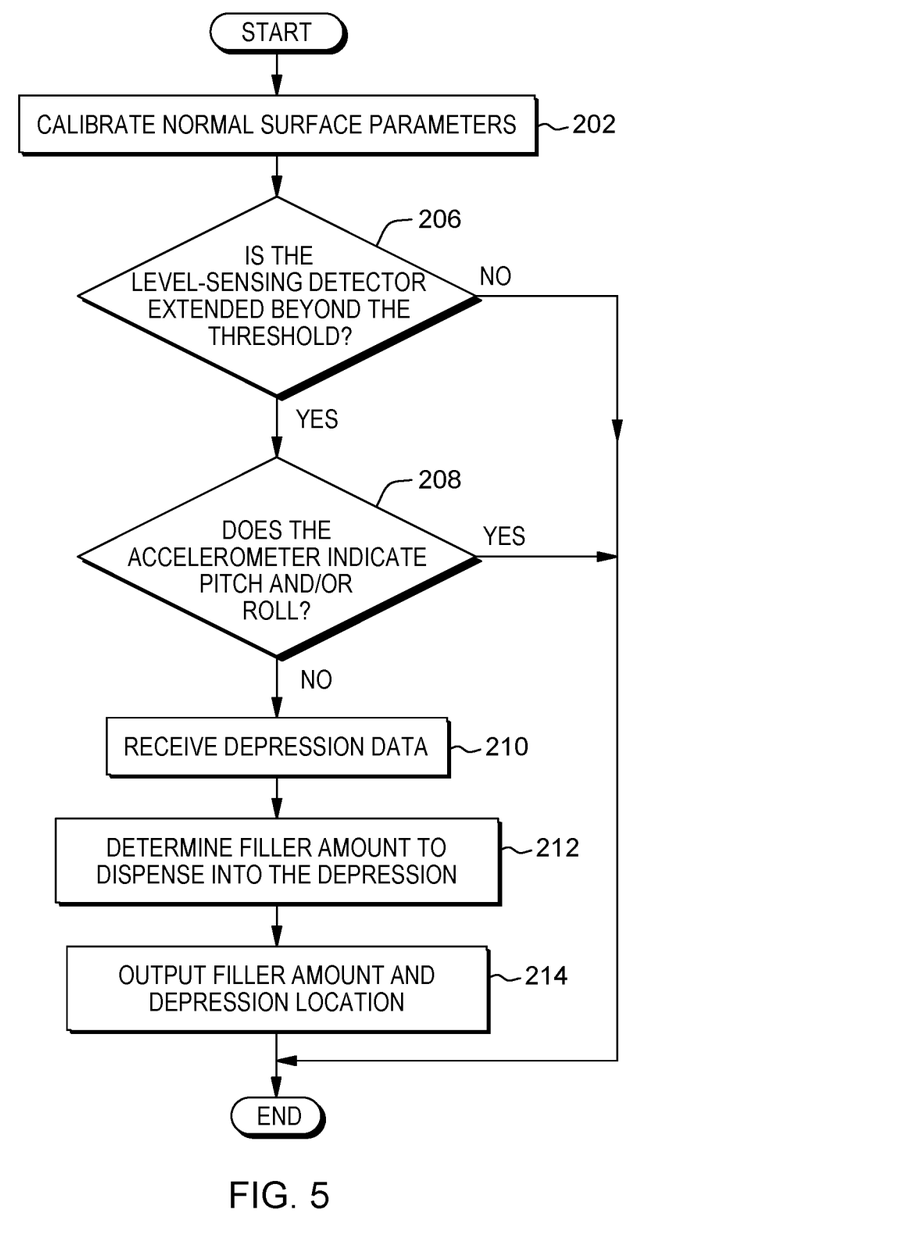
FIG. 5 is a flowchart depicting operational steps performed by computing device(s) 37, in accordance with an embodiment of the present invention.

FIG. 5 is a flowchart depicting operational steps performed by computing device(s) 37, in accordance with an embodiment of the present invention. Execution begins at start, where groundskeeping device 10 begins to operate across a greenspace (or other surface, in accordance with other embodiments of the invention). At step 202, computing device(s) 37 calibrate normal surface parameters and other parameters as groundskeeping device 10 travels across a greenspace. Computing device(s) 37 may, for example at step 202, determine a base level for a ground surface, or a pitch threshold or a roll threshold beyond which accelerometer(s) 33 indicate groundskeeping device 10 has tilted too much to provide an accurate reading regarding depression 50. As operation of groundskeeping device 10 continues, computing device(s) 37 continues to determine via recoil section sensor 31 the level of the level-sensing detector 19 on greenspace, and at step 206, computing device(s) 37 determines whether the level-sensing detector 19 extends past a depression threshold. If no, execution proceeds to end (or may restart, in various embodiments of the invention). If yes, execution proceeds to step 208 where computing device(s) 37 determines whether accelerometer(s) 33 indicate groundskeeping device 10 has pitched beyond a pitch threshold or rolled beyond a roll threshold. If computing device(s) 37 determine that groundskeeping device 10 has pitched or rolled, execution proceeds to end (or may restart). If computing device(s) 37 determine that groundskeeping device 10 has not pitched or rolled, execution proceeds to step 210 where data measured by level-sensing detector 19 regarding the depression 50 is received by computing device(s) 37, such as the length and width of the depression 50, and/or the location of the depression 50 as provided by the global positioning system 35 (if present in the embodiment). At step 212, computing device(s) 37 determines an amount of filler material, such as grass seed, soil, or grass seed mixed with soil to dispense by dispensing compartment 43, in accordance with an embodiment of the invention (or other materials, in accordance with alternative embodiments). At step 214, computing device(s) 37 commands the electronically operated spout 47 to dispense the determined amount of filler material, such grass seed, soil, or grass seed mixed with soil associated with the dispensing compartment 43 (or other materials, in other embodiments of the invention). Execution then proceeds to end.

Figure 6A:
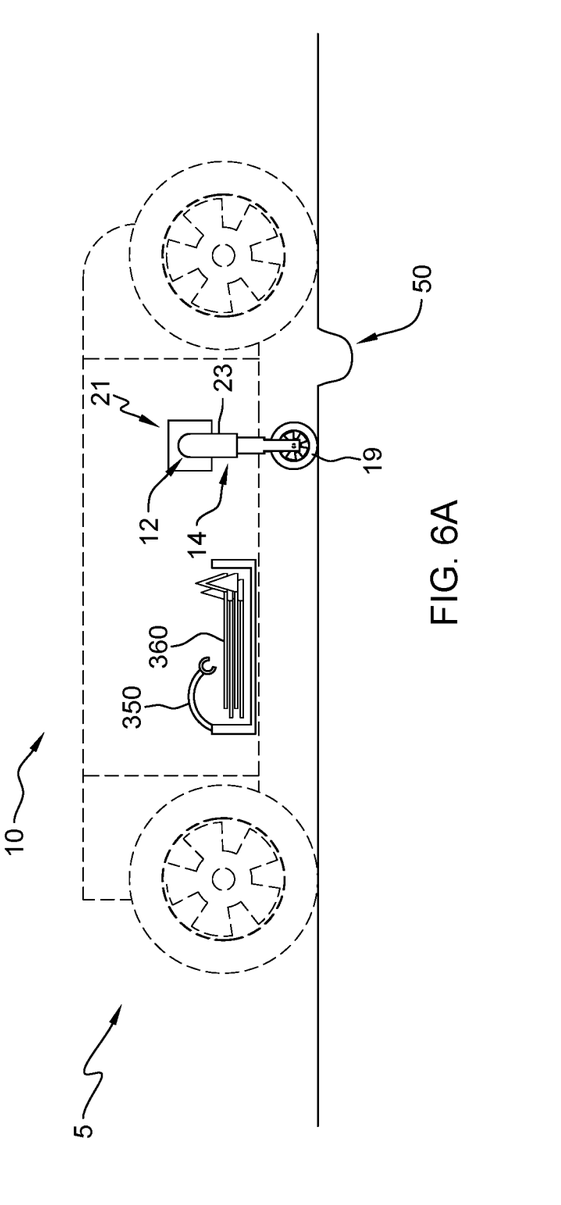
FIGS. 6A, 6B, and 6C display operation of an alternative embodiment of automated leveling system 5', in accordance with an embodiment of the invention.
Figure 6B:
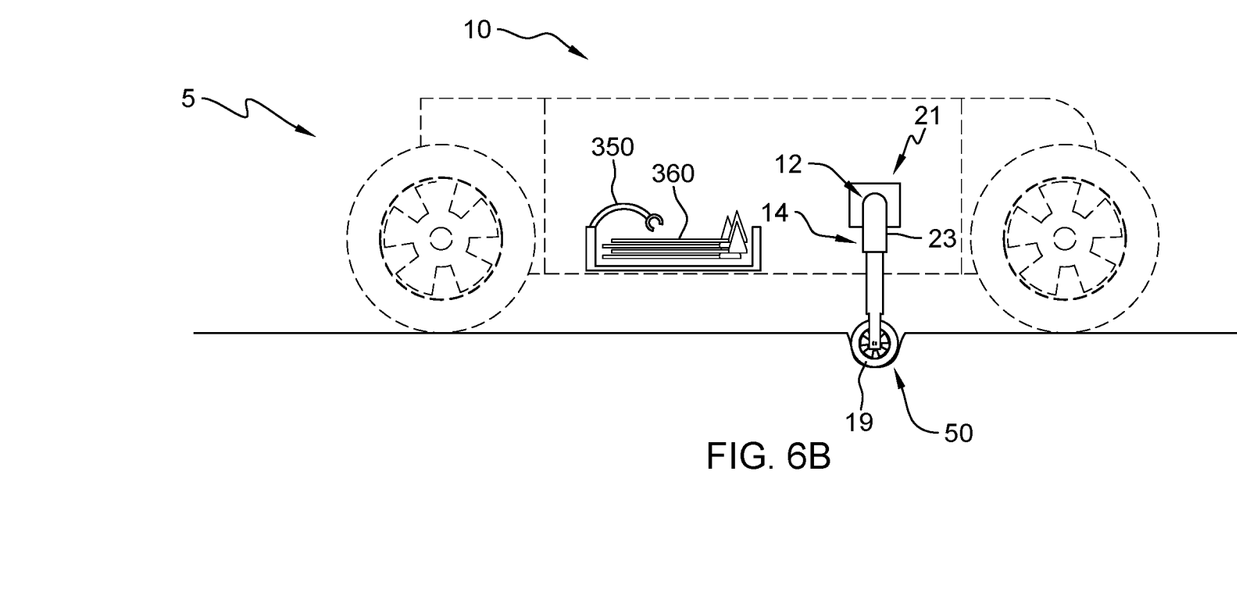
Figure 6C:
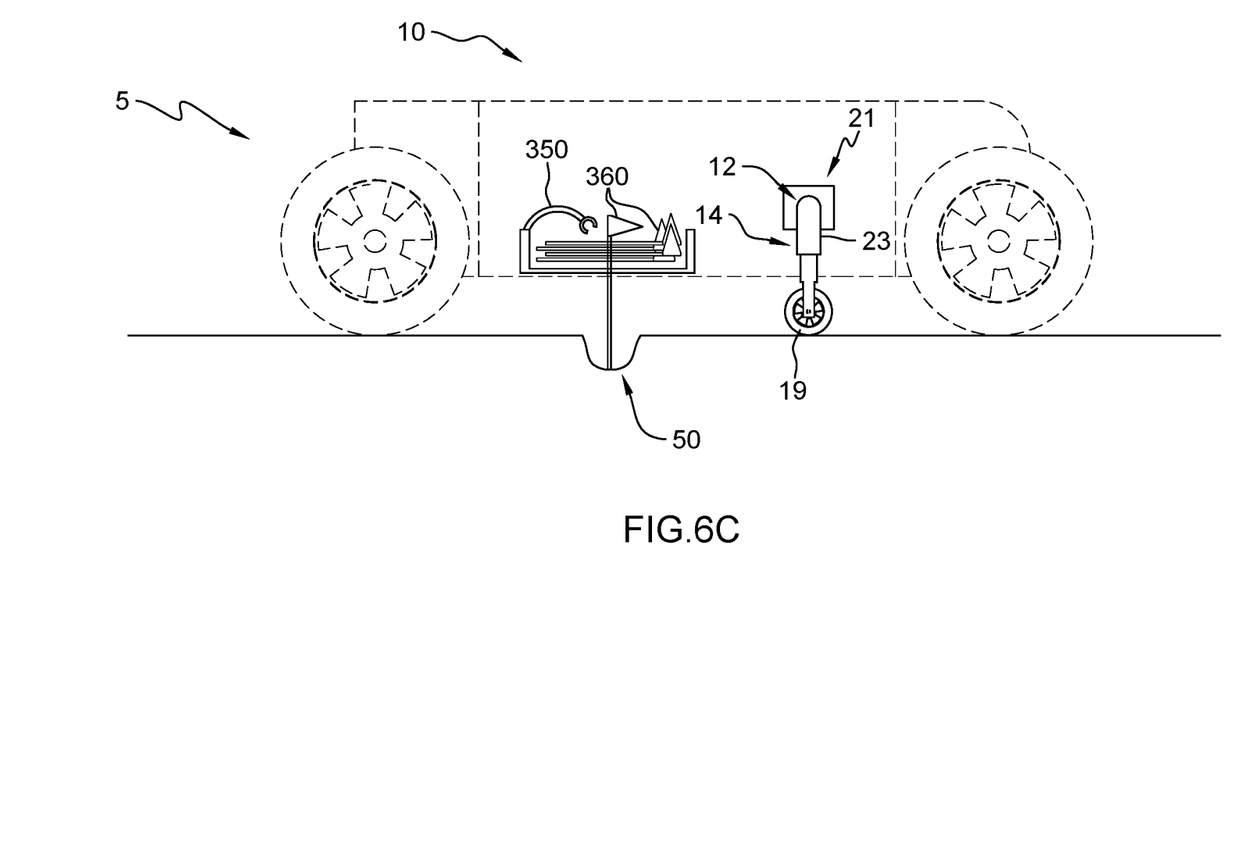

FIGS. 6A, 6B, and 6C shows an alternative embodiment of the present invention, designated generally as numeral 5'. Automated leveling system 5' is generally the same as automated leveling system 5, with the exception that in this embodiment, dispensing compartment 43 and electronically operated spout 47 are replaced with flag-planting module 350. Flag-planting module 350 is a mechanically operated module for automatically flagging depressions 50 immediately after they are encountered by level-sensing detector 19. The flag 360 planted by automated leveling system 5' serves to mark depression 50, to allow for a human user to immediately locate and easily manually repair depressions 50 located in the greenspace, to manually repair depressions 50 with grass seed, soil, or grass seed mixed with soil.

In view of the above, it will be seen that the several objects of the invention are achieved and other advantageous results attained. As various changes could be made in the above constructions without departing from the scope of the invention, it is intended that all subject matter contained in the above description shall be interpreted as illustrative and not in a limiting sense.

What is claimed is:

1. An automated leveling system for maintaining a surface, the automated leveling system comprising:
    a surface traveling device; and
    a leveling module attached to the surface traveling device, the leveling module comprising a depression detector arm assembly, at least one computing device, and a level-sensing detector, the level-sensing detector sensing a level of a surface as the surface traveling device operates across the surface, the level-sensing detector moving across the surface according to the operation of the surface traveling device, and transmitting a depression reporting signal to computing device for processing, wherein the depression reporting signal indicates the presence of a depression in the surface if the level-sensing detector contacts a depression in the surface over a depression threshold, and wherein the depression reporting signal is not processed if an accelerometer indicates that the surface traveling device has pitched beyond a pitch threshold or rolled beyond a roll threshold.

2. The automated leveling system of claim 1, wherein the depression detector arm assembly comprises a surface traveling device attachment component, a detector-holding rod holding the level-sensing detector, and a recoil section located within the surface traveling device attachment component and the detector-holding rod, the surface traveling device attachment component adapted for attaching the depression detector arm assembly and the level-sensing detector to the surface traveling device, the detector-holding rod extending towards the surface and holding the level-sensing detector where the surface traveling device is operating, and the recoil section attached to the depression detector arm assembly and the surface traveling device attachment component providing elastic force to push the level-sensing detector towards the surface while the surface traveling device is operating.

3. The automated leveling system of claim 2, wherein the level-sensing detector comprises a wheel adapted for rolling on the surface as the surface traveling device operates across the surface.

4. The automated leveling system of claim 2, further comprising a global positioning system to indicate a location of the surface traveling device during operation to be used to indicate a depression gps location in the surface.

5. The automated leveling system of claim 4, wherein the computing device transmits the depression gps location in the surface to a recipient.

6. The automated leveling system of claim 5, wherein the computing device accesses weather data and further transmits to the recipient an optimal time to repair the depression based on the weather data.

7. The automated leveling system of claim 2, further comprising a dispensing compartment for storing and dispensing grass seed, soil, or grass seed mixed with soil, the dispensing compartment having an electronically operated spout for dispensing grass seed, soil, or grass seed mixed with soil, wherein the computing device determines an amount of grass seed, soil, or grass seed mixed with soil to be dispensed by the dispensing compartment to repair the depression in the surface.

8. The automated leveling system of claim 7, wherein the computing device opens the electronically operated spout to dispense the determined amount of grass seed, soil, or grass seed mixed with soil to repair the detected depression.

9. The automated leveling system of claim 2, wherein the computing device utilizes a mathematical algorithm to determine an amount of grass seed, soil, or grass seed and soil mix to repair the depression.

10. The automated leveling system of claim 9, wherein the computing device notifies a recipient of the determined amount of grass seed, soil, or grass seed mixed with soil to repair the detected depression.

11. The automated leveling system of claim 9, wherein a dispensing compartment is located on a side or a rear of an axis of travel of the surface traveling device.

12. The automated leveling system of claim 2, wherein the surface traveling device attachment component houses selectively one or more of the following:
    the accelerometer;
    the computing device; and
    the global positioning system.

13. The automated leveling system of claim 2, wherein the surface traveling device is a manually controlled or automatically controlled lawnmower.

14. A method for automatic groundskeeping using an automated leveling module associated with a surface traveling device for maintaining a surface, the method comprising:
    calibrating by a computing device normal surface parameters as a surface traveling device travels across a surface;

determining by the computing device via a recoil section sensor a level of a level-sensing detector associated with an automated leveling module on the surface to determine whether the level-sensing detector extends past a depression threshold for locating a depression in the surface;

identifying by the computing device whether one or more accelerometers indicate the surface traveling device has pitched beyond a pitch threshold or rolled beyond a roll threshold on the surface;

receiving by the computing device depression data, wherein the device depression data is based on the determining and the identifying;

determining by the computing device, based on the received device depression data, an amount of grass seed, soil, or grass seed mixed with soil to dispense by a dispensing compartment;

commanding by the computing device an electronically operated spout to dispense the determined amount of grass seed, soil, or grass seed mixed with soil by the electronically operated spout associated with the dispensing compartment.

15. The method of claim 14, further comprising receiving by a global positioning system a location of the depression in the surface.

16. The method of claim 14, further comprising transmitting by the computing device a notification to a user computing device regarding existence and location of the depression in the surface.

* * * * *